UNITED STATES PATENT OFFICE.

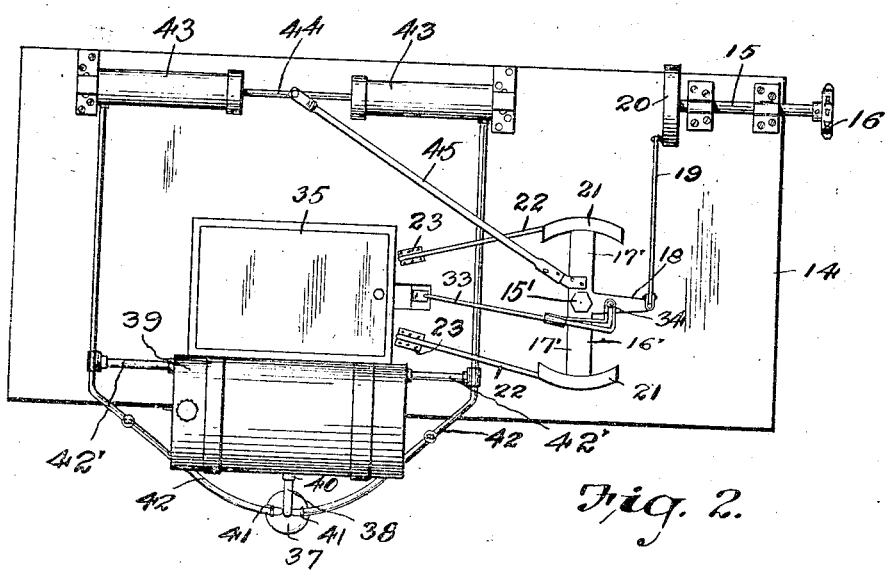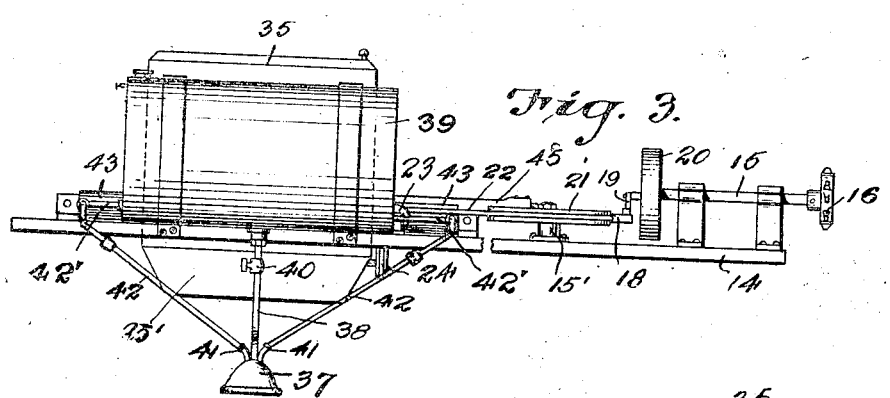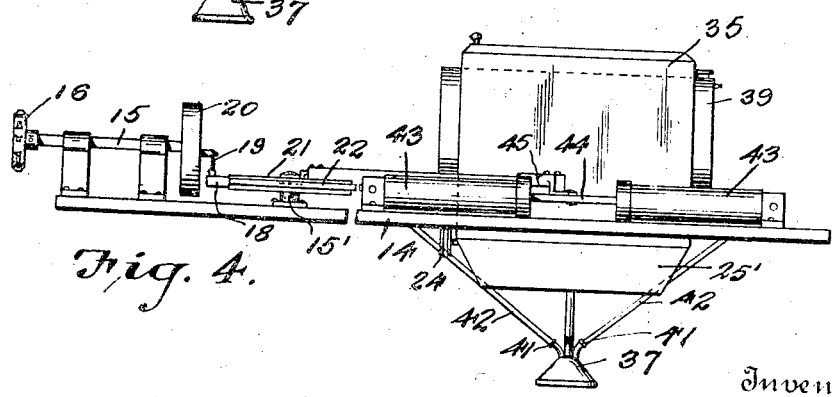

MAC L. FOX, OF COLUMBIAVILLE, MICHIGAN.

INSECTICIDE-DISTRIBUTER FOR CULTIVATORS.

1,312,969.   Specification of Letters Patent.   Patented Aug. 12, 1919.

Application filed October 21, 1918.   Serial No. 259,028.

*To all whom it may concern:*

Be it known that I, MAC L. FOX, a citizen of the United States, residing at Columbiaville, in the county of Lapeer and State of Michigan, have invented certain new and useful Improvements in Insecticide-Distributers for Cultivators, of which the following is a specification.

The invention has for an object to enable the efficient application of insecticide, the active element of which is essentially a powder more or less soluble in water, and particularly to enable the ready use of insecticide comprising powders more or less difficult to dissolve in water, obviating the necessity for putting the poison in solution, while yet avoiding the objectional method of merely sifting the powder on to the leaves of the plants where it may be dislodged easily, and leaving it so.

It is an important object to give an efficient means for insuring the finest subdivision of the powder as it is discharged upon plants, and an additional object is to coördinate therewith a special appliance for atomizing and spraying water upon the plants immediately before or during the ejection of powder by the device.

It is an important aim of the invention to effect the discharge of the powder in finely comminuted form, without giving such momentum thereto or to the air by which it is carried as would tend to cause an unnecessarily large proportion to move past the plant upon the air current created.

Figure 1:
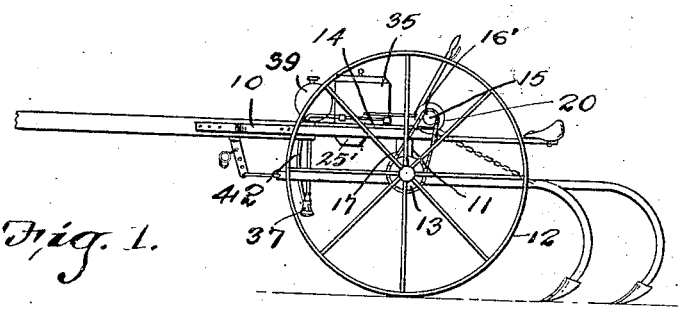
Figure 5:
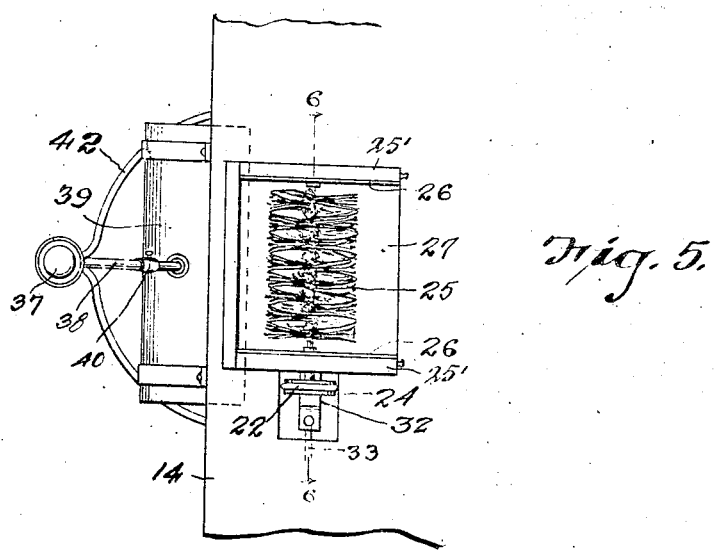
Figure 6:
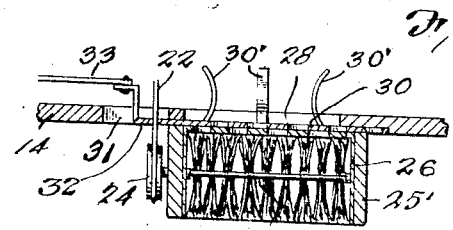

Further objects, advantages and features of invention reside in the specific construction of the parts, or their arrangement and combination, as hereinafter set forth and shown in the drawings, wherein, Figure 1 is a side elevation of a cultivator equipped with my invention, Fig. 2 is a top plan view of the applicator mechanism, in detail, Fig. 3 is an enlarged front elevation of the appliance, Fig. 4 is a rear elevation thereof, Fig. 5 is a bottom plan view of the device, Fig. 6 is a fragmentary sectional view on the line 6—6 of Fig. 5.

There is illustrated a cultivator 10, which may be of any usual construction, and in the present instance includes a straddle frame 11, supported by the wheels 12, one of which is provided with a sprocket 13. Upon the frame 11 there is secured a base plate 14, upon which there is mounted a shaft 15 having a sprocket 16 upon which the chain 17 is engaged, the chain being also engaged with the wheel sprocket, so that the mechanism may be driven from the supporting wheel 12 of the cultivator. Upon the plate 14 there is mounted a vertical rock shaft 15′, having a spider 16′ keyed thereon, provided with diametrically opposite arms 17′ and an intermediate arm 18, with which connection is made from the shaft 15 by means of the connecting rod 19, connected to a suitable eccentric 20 on the shaft 15. At the extremities of the arms 17′ saddle segments 21 are provided, to adjacent ends of which respective ends of a cord 22 are connected, these cords being laid in suitable grooves upon the outer sides of the saddles, and extending beyond the ends opposite those to which the cord is attached, over pulleys 23, mounted upon the upper side of the plate 14, and downwardly so that the intermediate part of the cord may pass snugly over a pulley 24 fixed upon the shaft of a rotating brush 25 mounted in a suitable manner upon the under side of the plate 14. In the present instance, the shaft of the brush is carried in the down turned ends 26 of a plate 27 having its intermediate portions secured upon the under side of the plate 14. A casing 25′ is provided to partly inclose the brush, the casing being open at its lower side, in order to keep the device clean and clear of earth or mud. A longitudinal slot 28 is formed through the plates 14, alined with the axis of the brush 25, and the plate 27 is provided with a longitudinal series of apertures 29 directly under the slot. The plate 14 is formed with a suitable channel in the under side immediately over the plate 27 in which there is mounted a sliding foraminate shutter 30. A large opening 31 is formed through the plate 14 immediately over the pulley 24, and extending some distance therebeyond, the shutter 30 having a narrow arm 32 extended outwardly into the slot 31, and thence upwardly, where it is connected with an eccentric link 33 at one end, the opposite end of the link being suitably pivoted upon a wrist 34 on one of the arms of the spider 16.

Immediately over the slot 28 in the plate 14 a suitable hopper 35 is mounted, arranged to discharge through the slot, and provided with a suitable removable cover for the introduction and protection of insecticide powder or the like.

If desired, the shutter 30 may be provided with fingers 30' extending up within the hopper, so that in addition to operating to prevent excessive amounts of the powder from passing from the hopper, it will also serve as an agitator to insure proper feeding of the powder as required.

At a suitable location in advance of the brush 25, a water spraying nozzle 37 is carried by the apparatus, in the present instance being mounted upon a pipe 38 extended vertically downward from a suitable tank 39 mounted upon the upper side of the plate 14 close beside the hopper 25. A regulating valve 40 is provided in this pipe for regulating the feed of water to the nozzle. The nozzle is of a suitable form for air supply connections 41, whereby the feeding of a supply of compressed air fed to the nozzle will properly atomize and spray the liquid passing downwardly through the pipe 38. In the present instance, the nozzle is provided with two air connections, of like form which are provided with suitable check valves to prevent return of air through the connections 41. Respective lines of hose 42 lead to the connections 41, extending to respective pump cylinders 43 of like form disposed in coaxial relation and suitably mounted upon the upper side of the plate 14, the pistons of which, not illustrated, are connected to a common piston rod, 44, receiving motion from a connecting rod 45, connected to the rod in any suitable manner, and also to a suitable eccentric on the spider 16.

In use, the device being supplied with water and insecticide powder as indicated and the cultivator being in motion, the sprocket 12 being considerably larger than the sprocket 16, the spider 16' will be rapidly oscillated, resulting in the reciprocation of the shutter 30, for the sifting of powder upon the brush 25; and during each longitudinal movement of the shutter, the brush will be rotated because of the motion communicated thereto by the cable 22 connected to the saddles upon the arms 17 of the spider 16', and it will be appreciated that the rotary movement of the brush will be alternately in opposite directions. This will result in the rapid diffusion of the powder sifted upon the brush into a cloud, which will settle upon plants thereunder. By the action of the pumping devices connected to the nozzle 37, the plants upon which the powder becomes deposited will have been previously moistened upon their surfaces, so that the powder will be caused to adhere effectively and become suitably attached or caked upon the plants to give the highest efficiency as an insecticide.

It may be observed that the reciprocation of the pump pistons are also synchronized with the action of the shutter and brush, so that if the nozzle is disposed close beside the brush, or thereunder, the discharged atomized water will impinge against the particles of powder and carry these particles with the water upon the plants, so that in effect a mixture of the water and insecticide is effected while both are in a finely subdivided condition. One method may be found preferable for use with certain orders of plants, while the other method may be found more desirable for other plants.

What is claimed:

1. An insecticide applicator including a powder discharging means, a rotary brush mounted thereunder, and means to rapidly rock the brush alternately in opposite directions.

2. A powder discharging device comprising a hopper, a discharge opening thereunder, a foraminate plate across the opening, a foraminate shutter element reciprocable upon the plate, a rotary brush alined with the opening, means to reciprocate the shutter, and means operatively associated with the last named means to rotate the brush alternately in opposite directions synchronously with reciprocation of said shutter.

3. In an applicator of the character described, a rock shaft, oppositely extended arms carried thereby, a rotating brush, having a drive pulley, a cable element engaged around the pulley and having the end portions connected to the respective arms of the rock shaft, a powder discharging device mounted over the brush including a foraminate element, a shutter element reciprocable in association therewith for alternate closing and opening of the discharge opening of the device, and an eccentric connection between the rock shaft and shutter, for reciprocation of the shutter coincidently with rotation of said brush, and means to rock said shaft.

In testimony whereof I have affixed my signature in the presence of two witnesses.

MAC L. FOX.

Witnesses:
ALFRED W. BURGESS,
W. H. TIBBITS.